UNITED STATES PATENT OFFICE.

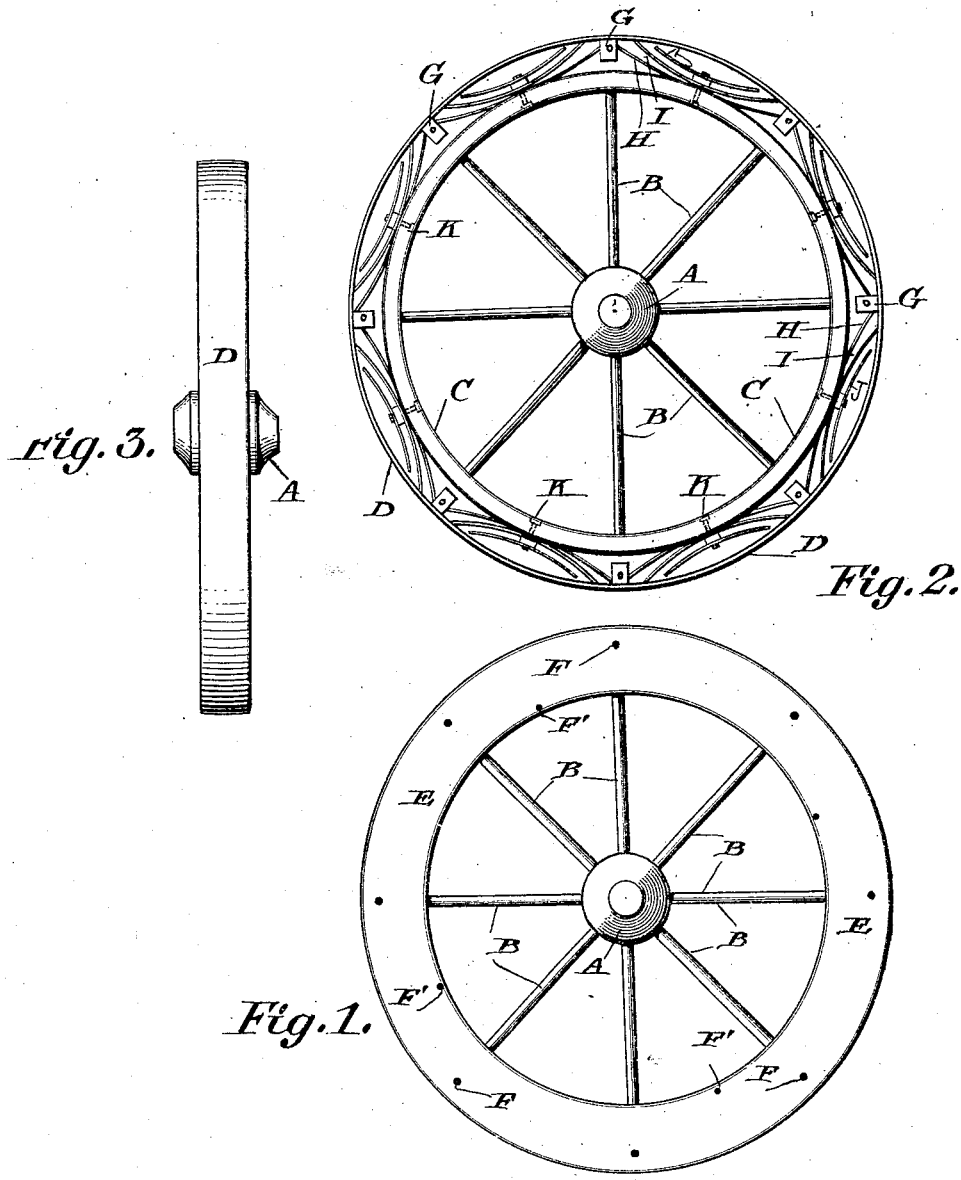

RANSOM E. RATHBUN, OF SIOUX CITY, IOWA.

CUSHION-TIRE.

No. 814,729.

Specification of Letters Patent.

Patented March 13, 1906.

Application filed February 6, 1905. Serial No. 244,390.

*To all whom it may concern:*

Be it known that I, RANSOM E. RATHBUN, a citizen of the United States, residing at Sioux City, in the county of Woodbury and State of Iowa, have invented a new and useful Spring-Cushion Tire, of which the following is a specification.

My invention relates to the wheels of vehicles, and has for its object the provision of a spring-cushion for the tire of the wheel which will be able to support any desired load and at the same time furnish the required elasticity.

The invention is especially adapted for automobiles, owing to its strength, cheapness, and durability, but may be applied to any kind of vehicle.

The invention consists in the novelty of construction, combination, and arrangement of parts, as will be pointed out more definitely in the claims.

In the drawings, Figure 1 is a side view of a wheel to which my invention is attached. Fig. 2 is the same view with the shields removed. Fig. 3 is a plan view of the same.

Referring now to the illustration, in which like parts are designated by similar letters of reference, A is the hub of the wheel, and B B the spokes.

C is the felly, and D a rim of steel or other suitable material outside of the felly, leaving a space between. The sides of the space are covered by shields E, secured to the outer rim by means of the bolts F, which pass through the blocks G. Other bolts F' secure the shields together, passing inside the felly. At regular intervals in the space between the felly and the rim, preferably opposite the end of each spoke, the rim is provided with blocks G, projecting toward, but not touching, the felly. Between each of the blocks springs H, I, and J are secured to the felly at the middle of the springs by means of the bolts K, which hold the middle part of the springs firmly upon the felly. The springs are all concave from the side toward the rim, the springs H extending between the blocks, the springs I being somewhat shorter, with the ends curving outward toward the rim, while the springs J are the shortest of all, the outwardly-curving ends being wholly free of contact with the rim. The springs are made of any suitable material possessing strength and elasticity, preferably the best of wrought-steel.

A hard-rubber tire may, if desired, be secured to the outer surface of the rim to deaden the sound of the steel upon the pavement.

The operation and utility of my invention will be readily understood. The pressure or weight upon the outer rim will compress the rim at the bottom where the rim is in contact with the pavement, pushing the block on that side of the wheel up toward the felly, the springs I gradually resisting the pressure. The compression of the rim at the bottom will tend to move the rest of the rim and the other blocks and springs upward around the wheel. If the load is light, the springs I will furnish all the resistance necessary, and when greater weight is added the springs H and J will meet the rim and add to the resistant elasticity of the wheel. If too great a load is carried, the blocks will meet the felly and relieve the springs, thus preventing the possibility of breakage. In case of any spring breaking the blocks will carry the weight of the wheel.

I am aware that it is not new to provide springs between the tire of a wheel and an outer rim, but I know of no wheel which combines the elements here described.

Having described my invention, what I claim as new, and desire to secure by Letters Patent, is—

1. In a vehicle-wheel, the combination of an inner felly, an outer rim having blocks projecting at regular intervals toward the felly, a layer of outwardly-curving springs secured at the middle to the felly between the blocks, the longest of said springs extending between the blocks, the shortest of the springs being normally free of contact with the outer rim until pressure is brought thereon, substantially as described.

2. In a vehicle-wheel, the combination of an inner felly, an outer rim forming a space between the felly and the rim, blocks secured to the inner surface of the rim and projecting toward but not normally touching the felly, springs H, I and J secured at the middle to the felly between the blocks and projecting outwardly toward the rim, shields secured to the rim covering the space between the felly and rim, and bolts passing inside the felly and securing the rims together, substantially as described.

In testimony whereof I hereunto affix my signature in the presence of two witnesses.

RANSOM E. RATHBUN.

Witnesses:
H. C. GARDINER.
F. W. LOHR.